Oct. 14, 1952     M. E. BOENIG     2,613,586
ROW MARKER

Filed May 10, 1949

Inventor

Martin E. Boenig

By *Clarence A. O'Brien and Harvey B. Jacobson*
                                     Attorneys Patented Oct. 14, 1952

2,613,586

UNITED STATES PATENT OFFICE 2,613,586

ROW MARKER

Martin E. Boenig, Woodsboro, Tex.

Application May 10, 1949, Serial No. 92,383

2 Claims. (Cl. 97—230)

1

The present invention relates to new and useful improvements in row markers, and more particularly to means for attaching the marker to the tool bar of a tractor operated plow for raising and lowering the marker into and out of marking position together with the raising and lowering of the plow by the usual power lift mechanism for the plow.

An important object of the invention is to provide a box-like shaft for easily and quickly mounting in position on the tool bar and to which the row marker is attached.

A further object is to provide a pivotally mounted marker blade with spring means for holding the marker downwardly in constantly marking position on uneven ground.

A still further object is to provide a marking attachment for plows of a simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
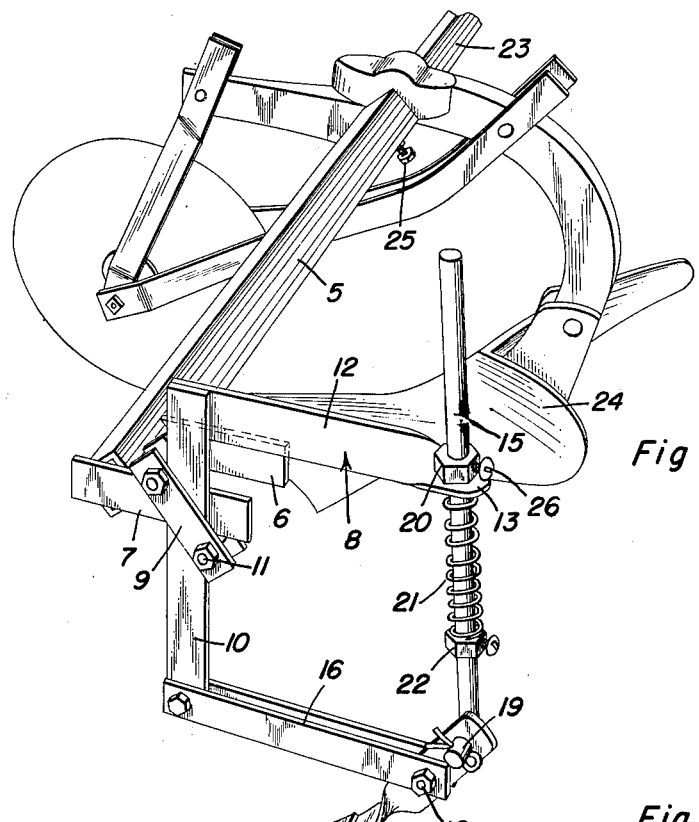
Figure 1 is a perspective view.
Figure 3:
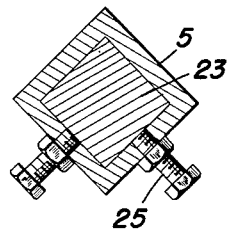
Figure 3 is a transverse sectional view of the tool bar and hollow or box shaft attached thereto.
Figure 2:
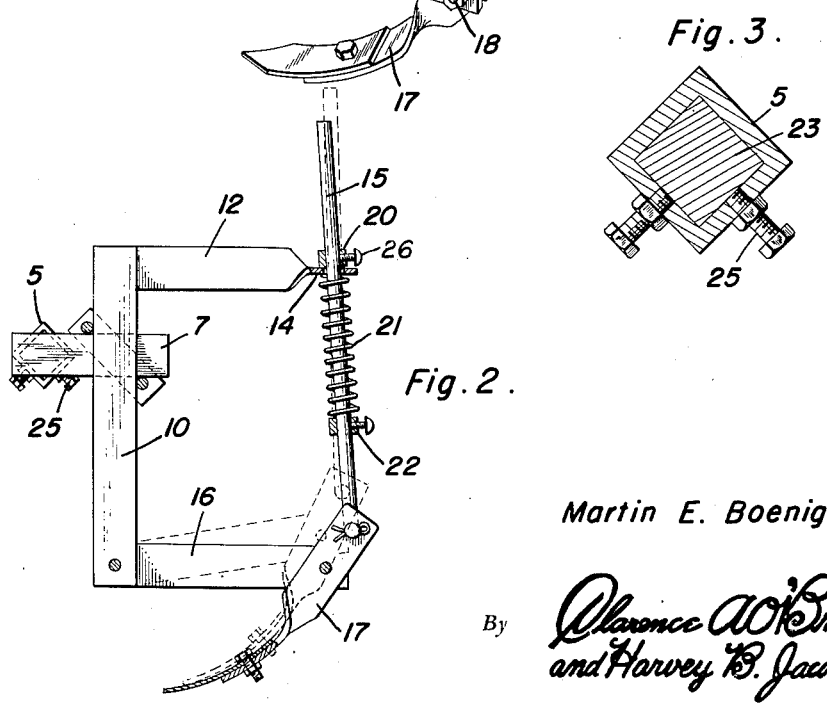
Figure 2 is a side elevational view with parts broken away and shown in section.

Referring now to the drawing in detail wherein, for the purpose of illustration, I have disclosed a preferred embodiment of the invention, the numeral 5 designates a hollow, or tubular, shaft of polygonal cross section, to one end of which inner and outer spaced parallel arms 6 and 7 are suitably secured in a transversely extending position at one side of shaft 5.

An L-shaped frame 8, preferably of strap metal construction, is secured in an inverted position to one of the arms 6 or 7 by clamping plates 9, clamping the vertical member 10 of the frame to the arm by bolts and nuts 11.

The upper horizontal member 12 of frame 8 is twisted to lie in a horizontal plane as shown at 13 and is provided with an opening 14 in which a rod 15 is positioned for vertical sliding movement.

A pair of arms 16 are pivoted at one end to the lower end of vertical frame member 10 and are positioned under upper frame member 12 and a marking blade 17 is pivoted adjacent its upper end between the arms 16 by means of a bolt and nut or the like 18. The lower end of rod 15 is bent horizontally as shown at 19 and pivotally connected to the upper end of marking blade 17 above the arms 16.

An adjustable stop collar 20 is secured in slidably adjusted position on rod 15 above frame member 12 by means of a set screw 26, and a coil spring 21 is positioned on rod 15 under frame member 12 with an adjustable collar or stop 22 secured on the lower portion of rod 15 to adjust the tension of spring 21.

In the operation of the device, the hollow shaft 5 is sleeved onto the outer end of the polygonal tool bar 23 of a farm tractor, the tool bar also having a plow 24 or other earth-working tool secured thereto in the usual manner for raising and lowering the plow by vertical swinging of the tool bar, this raising and lowering action usually being accomplished by a power lift (not shown) of the tractor.

The box or hollow shaft 5 is secured against sliding movement on the tool bar 23 by means of one or more set screws 25 and the hollow shaft or box 5 is closely fitted on the tool bar to prevent rotation thereof on the tool bar, and raise or lower marking blade 17 together with the raising and lowering movement of plow 24.

The marking blade 17 is urged downwardly into marking position with the ground by means of coil spring 21 which also exerts a downward pressure on pivoted arms 16 to which the marker blade 17 is attached, the marker blade thus being held in constant and uniform marking contact with the ground where the surface is uneven.

Spring 21 holds the lower end of marking blade 17 in a forwardly inclined position and permits swinging of the blade rearwardly to prevent damage by rocks or other obstructions.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A row marker for attachment to a vertically swingable tractor tool bar of polygonal cross section comprising an elongated tubular member adapted to be sleeved onto said bar to swing therewith and conforming in cross section thereto to prevent rotation thereof on said bar, a marking blade, a support for said blade including a rigid upper horizontal arm and a pivoted vertically swingable lower arm of the same length as said upper arm, means to mount said support on said member in rearwardly spaced relation thereto with said arms extending rearwardly therefrom, said blade being pivoted intermediate its ends in upright position on the rear end of said lower arm, a rod vertically slidable and laterally swingable in the rear end of said upper arm and having a lower end pivoted to said blade above the pivot of the blade, and a coil spring on said rod urging the rod downwardly to hold the lower arm downwardly and the blade inclined downwardly and forwardly.

2. A row marker according to claim 1 wherein said means includes a pair of rearwardly extending arms on said member spaced apart along the same, and a clamp for attaching said support to the arms of the pair selectively to variably position said support on said member.

MARTIN E. BOENIG.

REFERENCES CITED

The following references are of record in the file of this patent:

UNITED STATES PATENTS

| Number | Name | Date |
|---|---|---|
| 834,030 | Sutton | Oct. 23, 1906 |
| 845,573 | Perdue | Feb. 26, 1907 |
| 1,062,882 | Bruene | May 27, 1913 |
| 1,219,342 | Myers | Mar. 13, 1917 |
| 1,944,939 | Kunderd | Jan. 30, 1934 |